United States Patent [19]

Pauliukonis

[11] Patent Number: 4,457,498
[45] Date of Patent: Jul. 3, 1984

[54] FORCE BALANCED DIE CYLINDERS

[76] Inventor: Richard S. Pauliukonis, 6660 Greenbriar Dr., Cleveland, Ohio 44130

[21] Appl. No.: 372,121

[22] Filed: Apr. 27, 1982

[51] Int. Cl.$^3$ .............................................. F16F 9/02
[52] U.S. Cl. .............................. 267/130; 16/DIG. 9; 83/617; 188/288; 188/322.19; 188/322.18; 267/119; 267/124; 267/129; 267/137
[58] Field of Search ...................... 188/322.18, 322.19, 188/284, 288; 91/416, 399; 267/114, 130, 137, 119, 124, 129; 92/162 R; 83/617, 615; 16/52, 56, 58, 66, 84, DIG. 9

[56] References Cited

U.S. PATENT DOCUMENTS

| | | | |
|---|---|---|---|
| 3,059,269 | 10/1962 | Selinger et al. | 16/84 X |
| 3,062,331 | 11/1962 | Wyman | 188/288 |
| 3,842,717 | 10/1974 | Prescott | 92/162 R |
| 4,111,030 | 9/1978 | Shepard et al. | 267/119 |

Primary Examiner—Bruce H. Stoner, Jr.
Assistant Examiner—Michael P. Gilday
Attorney, Agent, or Firm—R. S. Pauliukonis

[57] ABSTRACT

A new breed of die cylinders operating at 1000–5000 psig. working fluid pressures and adaptable for use individually or by manifolding with punch presses to cushion dies can be operated with maximum rated pressure force against a force which a ram develops in one direction and in the opposite direction with partial pressure force which the die cylinders exert when force balanced. The following is accomplished by loading a piston underside by the same working fluid pressure when the piston bottoms inside a cylinder housing at the end of the ram induced stroke enabling an instant high pressure surge of fluid, be it Nitrogen gas or other working fluid, to enter the piston underside provided with a piston rod and exert a resistance force proportional to the net free area exposed thereto thereby providing force balanced cylinder operation. The die cylinder capacity during the cycle of rod extension will be controlled by the size of the piston rod while the die cylinder capacity during the cycle of rod withdrawal under ram load will be controlled by the size of the piston face opposite to that provided with the piston rod. The structure includes provisions for discharge of the working fluid from the piston underside at the end of the cylinder stroke with the rod extended, and for generating a vacuum behind the piston during rod withdrawal until the ram stroke is completed, and viceversa, providing for directional braking of the die cylinder operation analogous to the operation of die cylinders with built-in time delays, but, at considerably reduced cost to construct and to operate die cylinders of this general type.

6 Claims, 2 Drawing Figures

FORCE BALANCED DIE CYLINDERS

This invention relates to die cylinders used as powerful and compact cushions for punch press operation in general and to a simple arrangement providing an ideal die cushion by a cylinder which incorporates design for balanced force in particular. Die cylinders constitute a known and most effective means for obtaining high pressure pad forces in stamping processes such as forming, drawing, stripping, etc. when incorporated into the dies of punch presses. However, operating on principles of spring cushioning, die cylinders not only need complicated system arrangements which include high pressure reservoirs of working fluids under pressures of 1000–5000 psig., valves, pumps or compressors but also complicated connections therebetween leading to premature failures with messy leaks. Although air cushions are less untidy, they are pressure limited. Charging cylinders with high pressure gas such as Nitrogen has become an accepted solution in many an application but not a substitution to the hydraulic cushions which appear to offer superior control in return of the piston rod to the extended position. In systems with Nitrogen cylinders the motion of piston rod follows the motion of the punch press ram inhibiting knockout of the part from the die significantly. In turn, hydraulics with time delays are still employed for cushioning dies eventhough hydraulic systems often are not only too complicated but too costly as well. The primary object of this invention is, therefore, to provide a die cylinder which is durable, economical and simple both structurally and functionally. A further object of the invention is to provide a cushioning system which entails provisions for force balanced operation. In particular, the object of this invention is to provide die cylinder with piston and rod motion which is less dependent on the ram motion in order to approach die operation analogous to that of the systems with time delays.

Other objects reside in novel details of construction and combination including arrangements of parts, all of which will be apparent from the description that follows by reference to the drawings.

IN THE DRAWINGS

Figure 1:
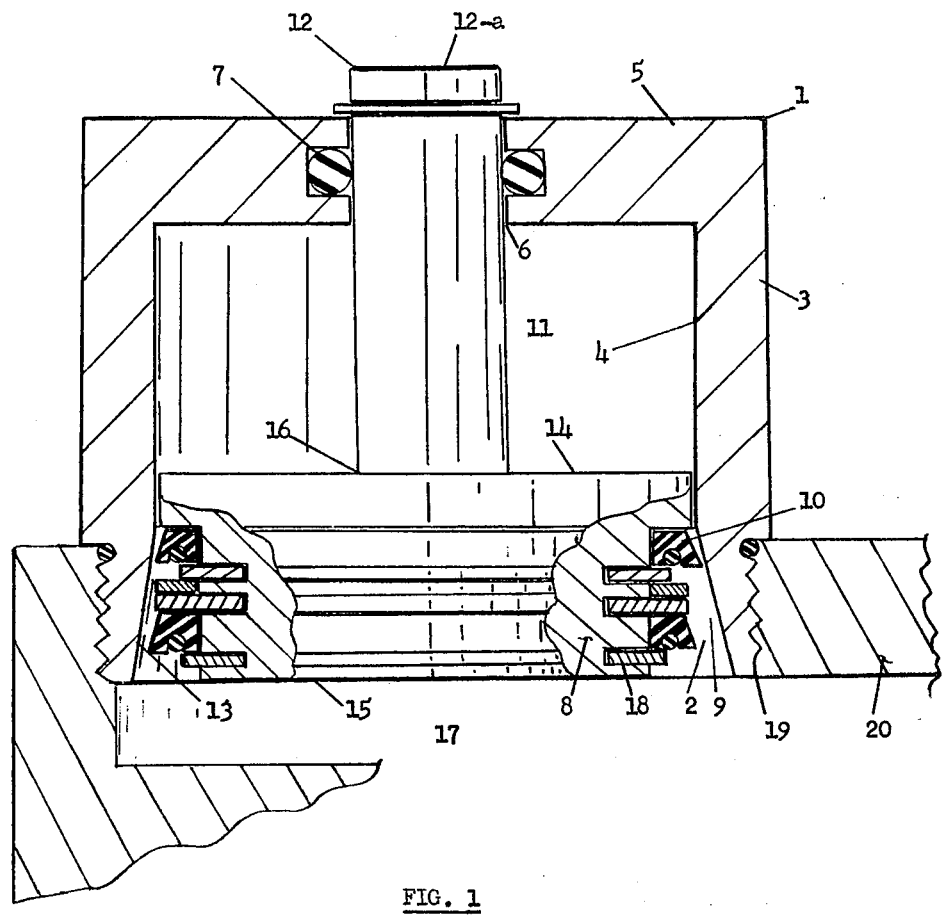
FIG. 1 is a cross-sectional view of the force balanced die cylinder representing one embodiment of the invention.

As FIG. 1 shows, die cylinder 1 in all respects is similar to the die cylinders known to the prior art, except for diametral relief 2 illustrated therein. In general, therefore, the die cylinder 1 consists of a cylindrical housing 3 having a bore 4 passing between a first top end 5 which is closed and provided with a small opening 6 with seal 7 for receiving slidably a rod 12 of a piston assembly 16 movable therein while an integral large diameter piston 8 moves inside bore 4 between the closed end 5 and a second bottom open cylinder mouth 9. Seals 10 inside a peripheral seal of piston 8 provide means for separating a cylinder annulus 11 created between piston rod 12 and bore 4. Seals 10 of U-cup configuration having channels face away from annulus 11 are preferred but O-ring seals may also serve the purpose well in some applications, along with other seals specified. When piston 8 is in a first downward position with rod retracted as shown, seals 10 are disengaged from housing bore at taper 13, adjacent mouth 9, forming a fluid relief 2 to enable fluid communication between a piston underside 14 provided with rod 12 and a piston face 15 which normally is exposed to a high pressure working fluid such as Nitrogen gas or the like. Obviously then, when fluid enters piston underside via relief 2, both piston sides experience pressure force in the ratio of net free areas exposed thereto. Obviously too, the piston face 15 will exert larger end force because of piston rod presence on the piston underside 14. Ergo, the piston rod assembly 16 will shift upwards as a result of this net differential end force prevailing by engaging piston seals 10 inside bore 4 snugly during the stroke that extends piston rod beyond the end 5 of housing 3 rendering cylinder in a second rod extended position (not shown). In cylinder operation, rod end 12-a may be attached through a die to a punch press ram which may exert a full force over rod 12 thereby transferring downward force to bear over piston face 15 which is in direct contact with working fluid under prevailing pressures of 1000 to 5000 psig providing cushion desired to the die while ram induced stroke moves piston and rod downward to a first rod retracted position, at which time seals 10 enter diametral relief 2 allowing an instant huge surge of high pressure fluid to piston underside 14 which during downstroke was under vacuum, triggering a dynamic unbalance with resultant braking of piston motion which in essence is analogous to the time delay action hydraulic cylinders may provide at great cost, until the ram force becomes removed to permit piston return by seal engagement inside bore 4 back to the original rod extended position during which time piston underside spills fluid trapped in annulus 11 over seals 10 into a high pressure region 17. This region 17 may be a large reservoir of working fluid inside a manifold, or it may be a void in a block of the die cylinder communicating with high pressure supply source by way of fluid connections (not shown) or a cavity of a die, depending on the application, consistent with the general practice in cushioned die operation.

External threads 19 adjacent second open cylinder mouth 9 can therefore be used for securing cylinder 1 to either a manifold plate 20 shown, or to an individual opening of a die, or simply secured to a separate flange mounted base provided with threaded opening that communicates with high pressure region 17. Retainer rings 18 may be employed for securing seals 10 inside peripheral seat of piston 8 to complete the assembly of die cylinder which FIG. 1 shows.

Although the drawing of FIG. 1 identifies piston 8 with at least 2 seals of U-cup configuration, in practice die cylinders may operate with as many as a single seal 10 or a plurality of seals 10, depending on the need and the working fluid pressures. In some applications U-cups may be replaced with O-ring seals for equally successful die cylinder operation with force balancing provisions of this invention. This may be seen by reference to FIG. 2 which identifies pertinent specifics in a fragmentary section since the rest of the cylinder is identical to that of FIG. 1.

Figure 2:
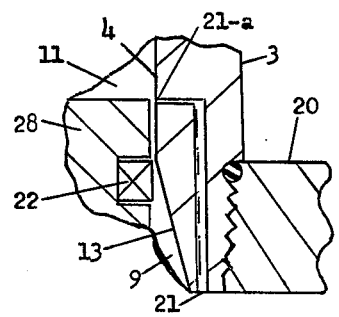
FIG. 2 is a fragmentary section taken through cylinder bottom slightly modified by holes.

In FIG. 2 cylinder housing 3 is sectioned at the second bottom open cylinder mouth 9 to identify added adjacent taper 13 a set of vertically extending optional holes 21 provided with tiny exit orifices 21-a which enter annulus 11 radially above seal 22 to initiate step of pressure and force balancing described before when piston 28 is in a first downward position. Seal 22 may be a single seal of U-cup configuration or a single elastomeric O-ring seal placed into appropriate piston groove by stretching as FIG. 2 shows thereby dispensing with retainer rings 18 of FIG. 1 altogether, depending on the application, forces and pressures. It is not unusual to use O-rings up to 1500 psig working fluid pressure, and therefore it is within the economics to make bore 4 slightly larger for a given force cushion may require from simplification point of view in lieu of higher working fluid pressures which dictate the use of costly U-cup seals, such as depicted in FIG. 1. Also, when holes 21 are used in combination with taper 13. FIG. 2 shows, piston seals, be it seal 10 of FIG. 1 or seal 22 of FIG. 2, may suffer reduced seal disengagement effect from bore 4 to enter taper 13. This in turn will reduce significantly seal tear and wear and preserve its integrity to extend service life thereof. However, provisions shown by taper 13 of FIG. 1 and holes 21 of FIG. 2 may be employed in many applications individually as well, without departing from the scope and the spirit of this invention.

Nonetheless it must be stated here that regardless of the modifications FIG. 2 shows in the way of pressure balancing means between piston sides, the fact remains that the basic principle of force balancing stays nearly the same in both designs FIGS. 1 and 2 identify by way of example. In turn, die cylinders of the present state of the art can be converted easily to render improved operation by adaptation of provisions in FIG. 1 or FIG. 2 illustrated, or by any other means that lead to pressure balancing on both piston sides when piston rod is retracted for force balanced operation of the present invention. This is so because die cylinder industry has never considered pressure balancing through loading both piston sides simultaneously as a physical possibility, perhaps due to the failure to analyze forces which may appear to be non-existant but prevelent and subject to an exploitation under controlled regime this invention uncovered.

This invention is not restricted to the slavish imitation of each and every one of the details described above which have been set forth merely by way of example with the intent of most clearly setting forth the teachings of the invention. Obviously, devices may be provided which change, eliminate, and add certain specific structural details without departing from the invention described and claimed herein.

What is claimed is:

1. A force balanced die cylinder comprising: a cylinder housing having a bore passing therethrough between a first top end which is closed by a closure means provided with a smaller central opening therein including a seal adaptable of receiving slidably a piston rod passing therethrough of a large coaxial piston, said piston rod inside said bore comprising an annulus therebetween, and a second bottom end thereof provided with a diametral relief which is open and adaptable to be closed by said piston with seals of U-cup configuration of which seal channels facing said diametral relief are positioned inside peripheral grooves of said piston so as to expose said channels to a working fluid pressure of 1000 to 5000 pounds per square inch constantly acting over a piston face, opposite a piston underside facing said annulus, with a force large enough to keep said seal channels pressure tight against the walls of said bore during piston position change therein from a second piston rod extended position when said piston rod is moved by a ram force of a punch press in direct contact therewith for cushioning a blow thereof against said working fluid pressure said piston face experiences until said piston bottoms at said cylinder second bottom end provided with said diametral relief allowing working fluid to enter said piston underside, to a first piston rod retracted position of a very short duration before said ram force becomes removed from said piston rod facilitating an instant pressure loading of said piston underside for a substantially force balanced piston return to said second piston rod extended position until said ram blow becomes re-applied to said piston rod again, and vice-versa, including means for unloading said piston underside due to existance of force differential generated by different surface areas of said piston face versus said piston underside, provided with said piston rod, both exposed to a working fluid under high pressures exhibiting desired piston movement at considerably slower speed from said first to said second positions, not attainable by more complicated devices of prior art operated by compressible fluids such as gas.

2. A cylinder as in claim 1 wherein said force balancing means includes a pressure balancing vertically extending holes in said bottom end of said housing.

3. A cylinder as in claim 1 including a set of pressure balancing holes in said bottom end of said housing entering vertically therein to exit radially into the region of said annular space when said piston is in said first position.

4. A force balanced die cylinder as in claim 1, wherein said means for unloading said piston underside for a substantially force balanced piston return to said second rod extended position is automatic, due to a larger force acting over said piston face so as to force a spill-over of said working fluid over said seal channels from said unnulus during piston upward motion inside said housing bore, when said piston, having downwardly directed seal channels, re-enters said cylinder walls, trapping said working fluid temporarily for a gradual release thereof, until said piston returns to said second rod extended position with piston underside abutting said top end closure means, said piston position change from said second to said first is accompanied with a vacuum inside said annulus until said seal channels enter said diametral relief for said subsequent instant pressure loading of said piston underside again, and vice-versa, thereby providing needed cushion with resultant braking of upward piston motion when said working fluid such as compressed gas at large pressures becomes trapped in said annulus, including means for fluid spilling over said seals during said piston position change therein.

5. A force balanced die cylinder as in claim 1 wherein said diametral relief includes a short taper and wherein said piston is provided with a single peripheral groove for positioning said U-cup seal with seal channels facing said second bottom end thereof to facilitate said means of unloading said piston underside during a force balanced cylinder operation automatically by larger force acting over said piston face capable of spilling over trapped working fluid such as compressed gas from said annulus during said piston position change upwardly inside said bore.

6. A force balance die cylinder as in claim 1 wherein said piston is provided with a plurality of said U-cup seals spaced inside peripheral grooves in series along with associated retainer rings to secure said seals therein.

* * * * *